Nov. 4, 1969  R. M. HERBERT ET AL  3,476,411
PANEL COUPLING HAVING MEANS FOR PREVENTING
AXIAL AND ROTATIONAL MOVEMENT
Filed May 29, 1968
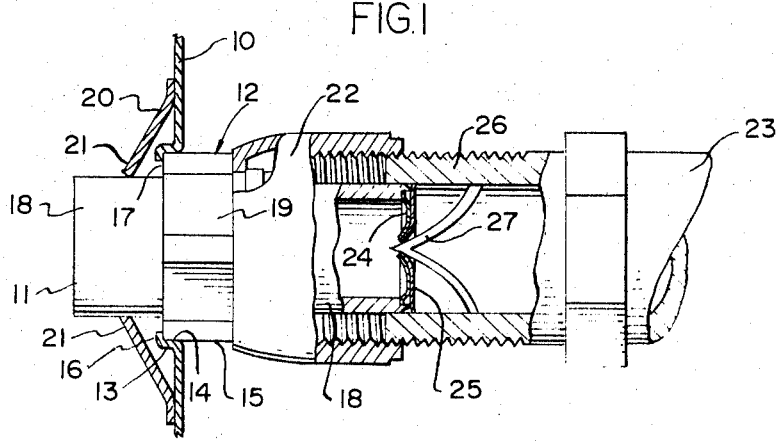
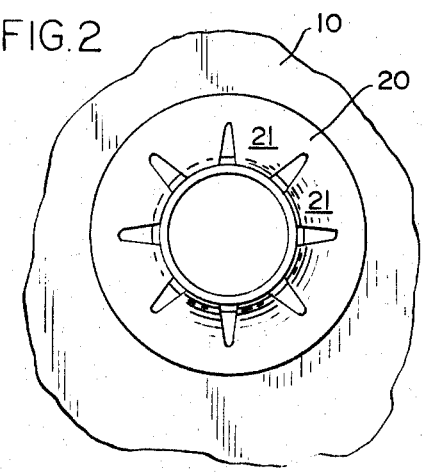 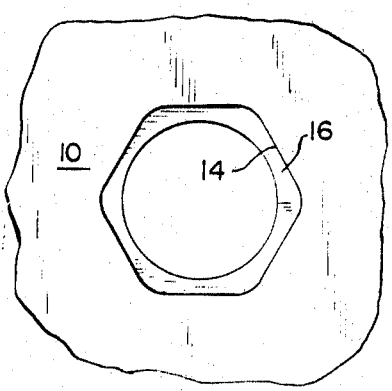
INVENTORS.
RICHARD M. HERBERT
JAMES C. HINDS
BY *Hofgren, Wegner, Allen, Stellman & McCord*
ATTORNEYS.

United States Patent Office 3,476,411
Patented Nov. 4, 1969

3,476,411
PANEL COUPLING HAVING MEANS FOR
PREVENTING AXIAL AND ROTATIONAL
MOVEMENT
Richard M. Herbert, Nashville, and James C. Hinds, Lewisburg, Tenn., assignors to Heil-Quaker Corporation, a corporation of Delaware
Filed May 29, 1968, Ser. No. 733,081
Int. Cl. F16l 5/00, 35/00, 37/00
U.S. Cl. 285—192                                    2 Claims

ABSTRACT OF THE DISCLOSURE

An apparatus for mounting a coupling member such as for use in a refrigeration evaporator assembly or a condenser-compressor assembly on a thin panel in which the coupling member is held against rotation in a noncircular opening in the panel surrounded by a flange from the panel at an angle thereto to provide a noncircular annular surface and with the coupling member having a noncircular surface adapted to bear against this flange surface so that there is a surface-to-surface contact rather than a panel edge to surface contact when the coupling member is in the opening. The panel is also provided with a spring clip for retaining the coupling member in the opening against substantial axial movement.

---

One of the features of this invention therefore is to provide an apparatus wherein the thin panel itself not only retains the coupling member in an opening in the panel but also secures the member against both rotation and axial movement.

Other features and advantages of the invention will be apparent from the following description of one embodiment thereof taken in conjunction with the accompanying drawings. Of the drawings:

FIGURE 1 is a fragmentary sectional view through a panel embodying the invention with a coupling member in position therein and shown in partial longitudinal section.

FIGURE 2 is a fragmentary front elevational view taken from the left of FIGURE 1.

FIGURE 3 is a side elevational view of the panel taken from the right side thereof as shown in FIGURE 1.

It is frequently necessary to mount a coupling member such as for connecting one part of a refrigeration system to another part of the system in a thin metal panel. In order to conserve labor it has been found desirable to mount one portion of the coupling member on the panel so that it will not turn with respect to the panel nor move axially thereto so that the workman can give his attention to manipulating the other part or parts of the coupling member. In a particular embodiment as illustrated in the accompanying drawings the apparatus of this invention provides a very simple arrangement wherein a shaped portion of the panel itself retains the coupling member against rotational movement and also against axial movement.

In the embodiment illustrated in the drawings there is disclosed a section of a thin metal panel 10 shaped to provide a socket to captivate one coupling member 11 of a three piece coupling device 12. This is accomplished by providing a noncircular opening in the panel surrounded by a flange 13 struck from the panel at an angle thereto, here shown as essentially a right angle, in order to provide a noncircular annular surface 14 of substantial width.

This noncircular surface 14 receives the noncircular surface 15 of the coupling member 11 when this member is in the opening as shown in FIGURE 1 so that the flange 13 holds the coupling member against rotation. By noncircular, of course, is meant out of round and in the embodiment illustrated, as is shown most clearly in FIGURE 3, this surface is hexagonal to receive the similar hexagonal surface 15 of the coupling member.

On the panel 10 there are also provided means for retaining the coupling device 12 against substantial axial movement. This comprises stop means on the flange 13 engaging the coupling member with the stop means in the embodiment illustrated being positioned on the flange 13. As shown in FIGURE 1 this stop means comprises an edge portion 16 on the edge of the flange 13 bent inwardly to engage the corner of a shoulder 17 on the one coupling member 11.

The coupling member 11 as illustrated comprises a cylindrical tubular part 18 extending away from the panel 10 and the larger area hexagonal part 19 whose outer surface is the surface 15.

The edge portion 16 engaging the shoulder 17 substantially limits the extent of movement of the coupling device 12 to the left as viewed in FIGURE 1. In order to prevent substantial movement of this coupling device 12 in the opposite direction there is mounted on the panel 10 to surround the flange 13 a circular annular spring steel clip 20 having its base in engagement with the panel 10 and a plurality of spring fingers 21 positioned outwardly of the flange 13 and bearing against the outer surface of the tubular part 18 to lock it in position. Thus, with this arrangement the flange edge part 16 prevents substantial movement of the coupling device 12 to the left as viewed in FIGURE 1 while the spring clip 20 prevents substantial movement to the right. The result is that by a very simple arrangement in the panel 10, the coupling member 11 is locked securely on the panel 10 so that a workman need only manipulate second and third coupling members to make a connection. The second coupling member is designated 22 in FIGURE 1 and comprises a female, threaded part and the third coupling member is designated 23 in FIGURE 1 and comprises a male, threaded part. U.S. Patent No. 3,202,442 entiled "Coupling" illustrates in greater detail the structure of a similar three piece coupling.

As is customary in this type of apparatus the tubular part 18 of the member 11 is itself connected to a tube (not shown) similar to the tube 23. The fluid within this tube is sealed by means of a metal diaphragm 24 across the end of the tubular part 18 of the first coupling member 11. The tube 23 is also provided with a similar diaphragm 25 on the interior thereof in order to seal fluid within the tube 23 against escape. Then, when the tube 23 is drawn into secure engagement by rotating the second coupling member 22 the diaphragms 24 and 25 are drawn up against each other as shown in FIGURE 1. In FIGURE 1 the threaded interior of the coupling member 22 engaging the threaded exterior of the end 26 of the tube 23 has drawn the two diaphragms into contact. Further rotation of the coupling member 22 to draw the tube 23 further into the interior of the member 22 causes a piercing element 27 within the interior of tube 23 to pierce both diaphragms 24 and 25 as illustrated in the customary manner and fold them back so as not to interfere with fluid flow.

As can be seen, the invention here provides a quick connecting coupling which is especially usable for connecting the parts of a refrigeration system such as a central air conditioner. It provides a simple arrangement constructed in principal part by shaping the panel itself to captivate one piece or coupling member of a three part coupling device in order to permit one man to work with the other two parts to complete the coupling. Because the panel itself is shaped to retain the one coupling member against rotation the apparatus is not only simple but inexpensive. Further, the structure for retaining the coupling device against axial movement is also quite simple being in part a portion of the panel itself and in part a simple spring steel clip bearing against the panel.

The embodiments of the invention in which an exclusive property or privilege is claimed are defined as follows:

1. Apparatus for mounting a coupling member on a thin panel, comprising: means forming a noncircular opening in said panel surrounded by a flange from said panel at an angle thereto to provide a noncircular annular surface, said coupling member having a noncircular surface adapted to bear against said flange surface when said member is in said opening; means on said panel engaging the exterior of said member for retaining said member against substantial axial movement in said opening comprising stop means on said flange engaging the exterior of said coupling member substantially preventing axial movement of said member in one direction; and means on said panel in addition to said stop means also engaging said coupling member and substantially preventing axial movement thereof in the opposite direction.

2. The apparatus of claim 1 wherein said additional means comprises a plurality of spring fingers mounted on said panel and engaging said coupling member outwardly of said flange and shoulder.

References Cited

UNITED STATES PATENTS

| 1,072,208 | 9/1913 | Dahl | 285—158 |
| 1,609,968 | 12/1926 | Schroeder | 285—202 |
| 2,118,672 | 5/1938 | Green | 285—158 X |
| 2,375,728 | 5/1945 | Cadwallader | 285—194 |
| 2,615,362 | 10/1952 | Churchman | 285—205 X |
| 3,202,442 | 8/1965 | Abbey et al. | 285—3 |

THOMAS F. CALLAGHAN, Primary Examiner

U.S. Cl. X.R.

285—205, 3